US 12,089,627 B2

(12) United States Patent
Grassmel et al.

(10) Patent No.: US 12,089,627 B2
(45) Date of Patent: Sep. 17, 2024

(54) MACHINE FOR THE TOBACCO PROCESSING INDUSTRY, IN PARTICULAR, A FILTER TIPPING MACHINE

(71) Applicant: KÖRBER TECHNOLOGIES GMBH, Hamburg (DE)

(72) Inventors: Ralf Grassmel, Jork (DE); Stefan Meissner, Schwarzenbek (DE)

(73) Assignee: Körber Technologies GMBH, Hamburg (DE)

( * ) Notice: Subject to any disclaimer, the term of this patent is extended or adjusted under 35 U.S.C. 154(b) by 1083 days.

(21) Appl. No.: 16/238,155

(22) Filed: Jan. 2, 2019

(65) Prior Publication Data

US 2019/0133179 A1    May 9, 2019

Related U.S. Application Data

(62) Division of application No. 14/305,740, filed on Jun. 16, 2014, now abandoned.

(30) Foreign Application Priority Data

Jun. 18, 2013   (DE) .................. 10 2013 211 424.9

(51) Int. Cl.
*A24C 5/47* (2006.01)
*A24C 5/14* (2006.01)
*A24C 5/60* (2006.01)
*B23K 26/00* (2014.01)

(52) U.S. Cl.
CPC .................. *A24C 5/47* (2013.01); *A24C 5/14* (2013.01); *A24C 5/606* (2013.01); *B23K 26/00* (2013.01)

(58) Field of Classification Search
CPC .. A24C 5/47; A24C 5/14; A24C 5/606; B23K 26/00
See application file for complete search history.

(56) References Cited

U.S. PATENT DOCUMENTS

| 4,121,595 A | 10/1978 | Heitmann |
| 4,224,498 A | 9/1980 | Grollimund |
| 4,265,254 A | 5/1981 | Koch |
| 4,524,785 A | 6/1985 | Seragnoli |

(Continued)

FOREIGN PATENT DOCUMENTS

| CN | 1649693 | 8/2005 |
| DE | 27 51 522 | 8/1978 |

(Continued)

*Primary Examiner* — Dionne W. Mayes
(74) *Attorney, Agent, or Firm* — GREENBLUM & BERNSTEIN, P.L.C.

(57) ABSTRACT

Laser supply unit for at least one laser device for processing at least one of rod-like articles of the tobacco processing industry and components of rod-like articles of the tobacco processing industry. The unit includes a supply frame structured to receive one or more supply devices for the at least one laser device and at least one of an adapter device structured to position the at least one laser device one of on or in the supply frame, at least one laser device structured to be positionable in operative connection with an adapter device of a machine of the tobacco processing industry. The at least one laser device is positionable in co-operation with the adapter device of the supply frame one of on or in the supply frame.

9 Claims, 5 Drawing Sheets

(56) References Cited

U.S. PATENT DOCUMENTS

| | | | | |
|---|---|---|---|---|
| 5,059,359 | A | * 10/1991 | Hull et al. | ............ B29C 64/135 |
| | | | | 118/620 |
| 5,556,826 | A | 9/1996 | Perrington | |
| 6,064,032 | A | 5/2000 | Voss | |
| 6,363,942 | B1 | 4/2002 | Dombek | |
| 6,815,637 | B2 | 11/2004 | Bell | |
| 2003/0226835 | A1 | 12/2003 | Bell | |
| 2005/0127046 | A1 | 6/2005 | Grassmel | |
| 2006/0207995 | A1* | 9/2006 | Erwin | ..................... G07F 11/62 |
| | | | | 221/211 |

FOREIGN PATENT DOCUMENTS

| | | |
|---|---|---|
| DE | 27 54 104 | 6/1979 |
| DE | 29 20 264 | 11/1979 |
| EP | 0 881 026 | 12/1998 |
| EP | 1 213 105 | 6/2002 |
| EP | 1 533 068 | 5/2005 |
| GB | 2 022 987 | 12/1979 |
| GB | 1 602 133 | 11/1981 |

\* cited by examiner

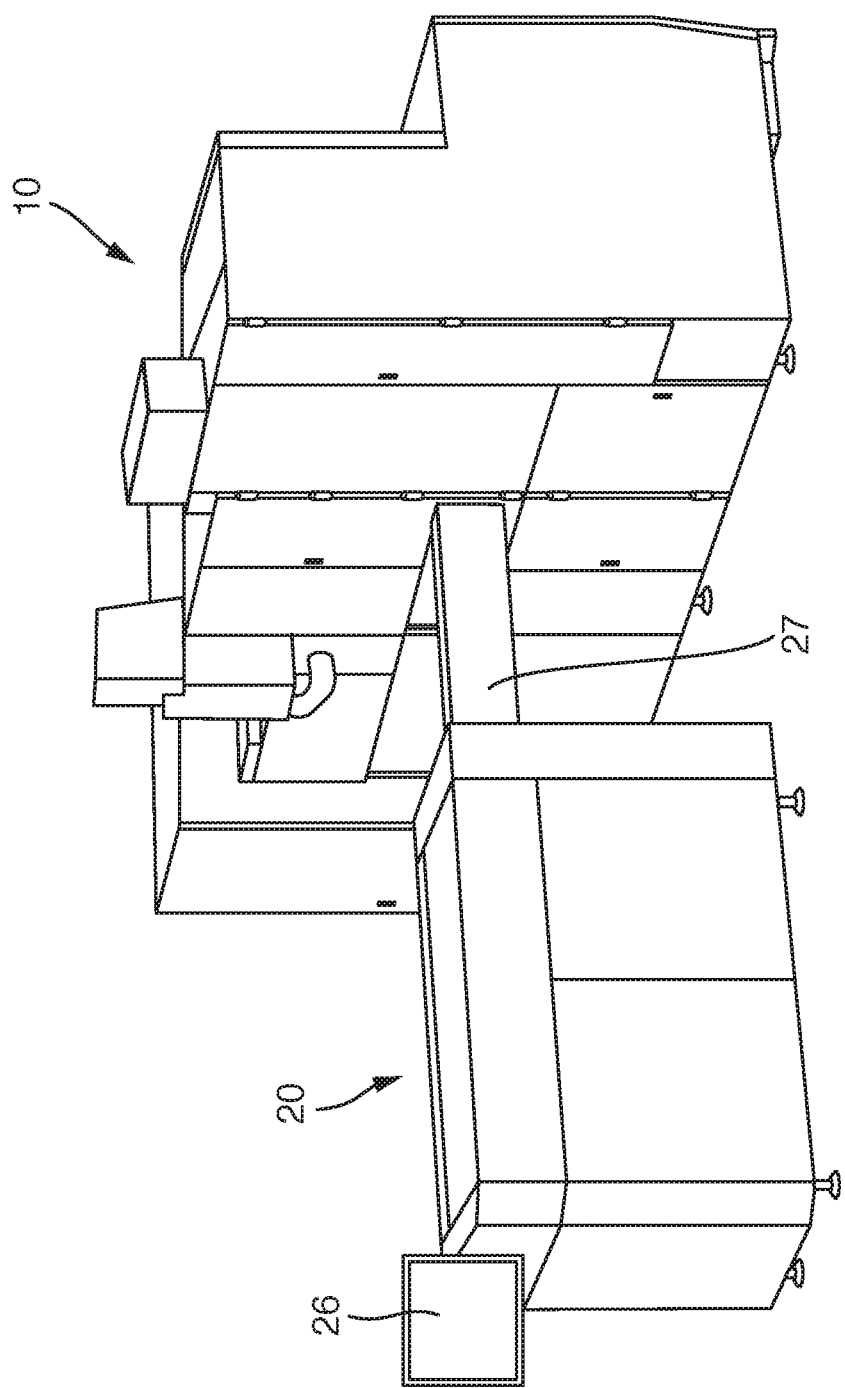

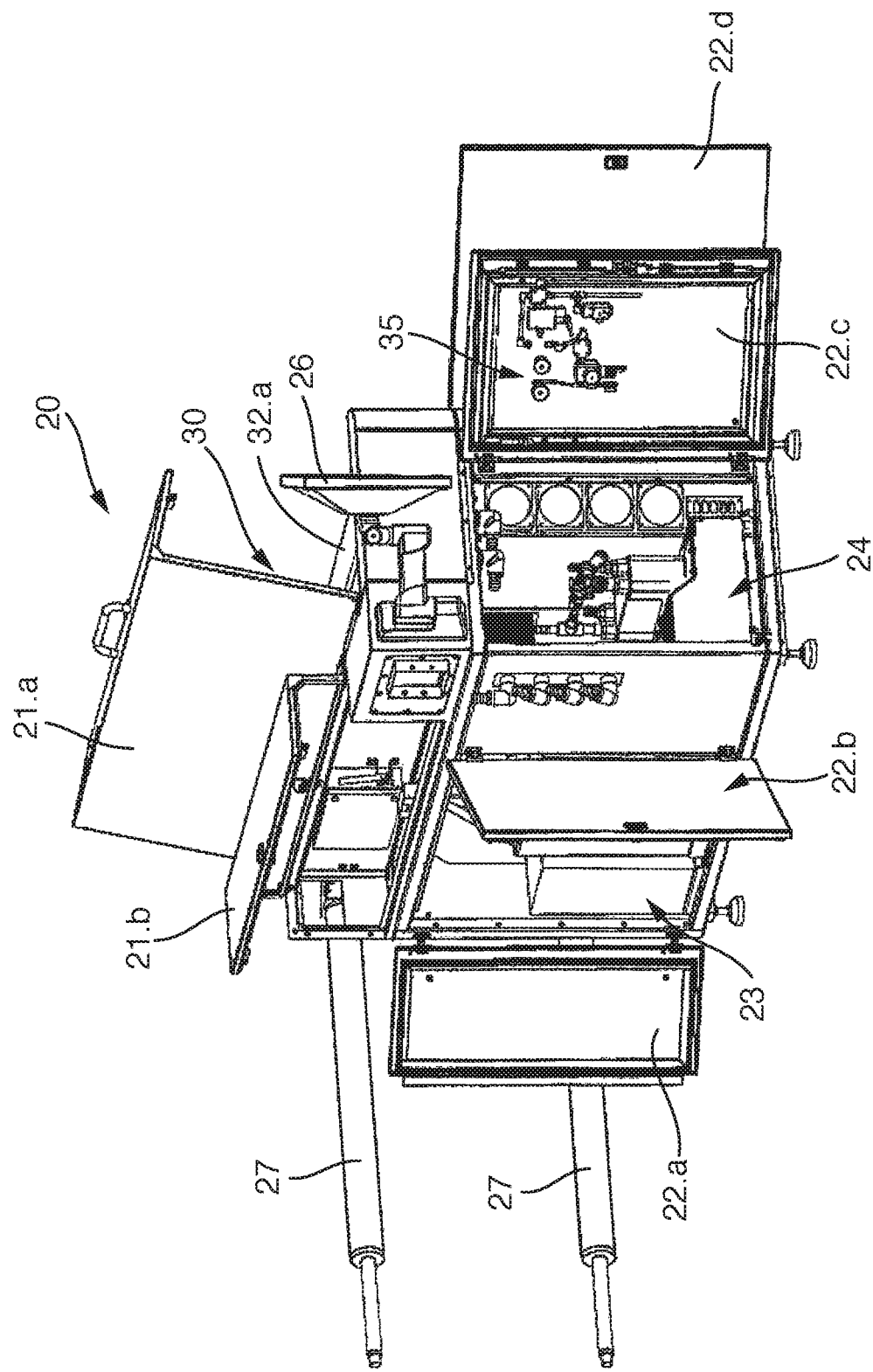

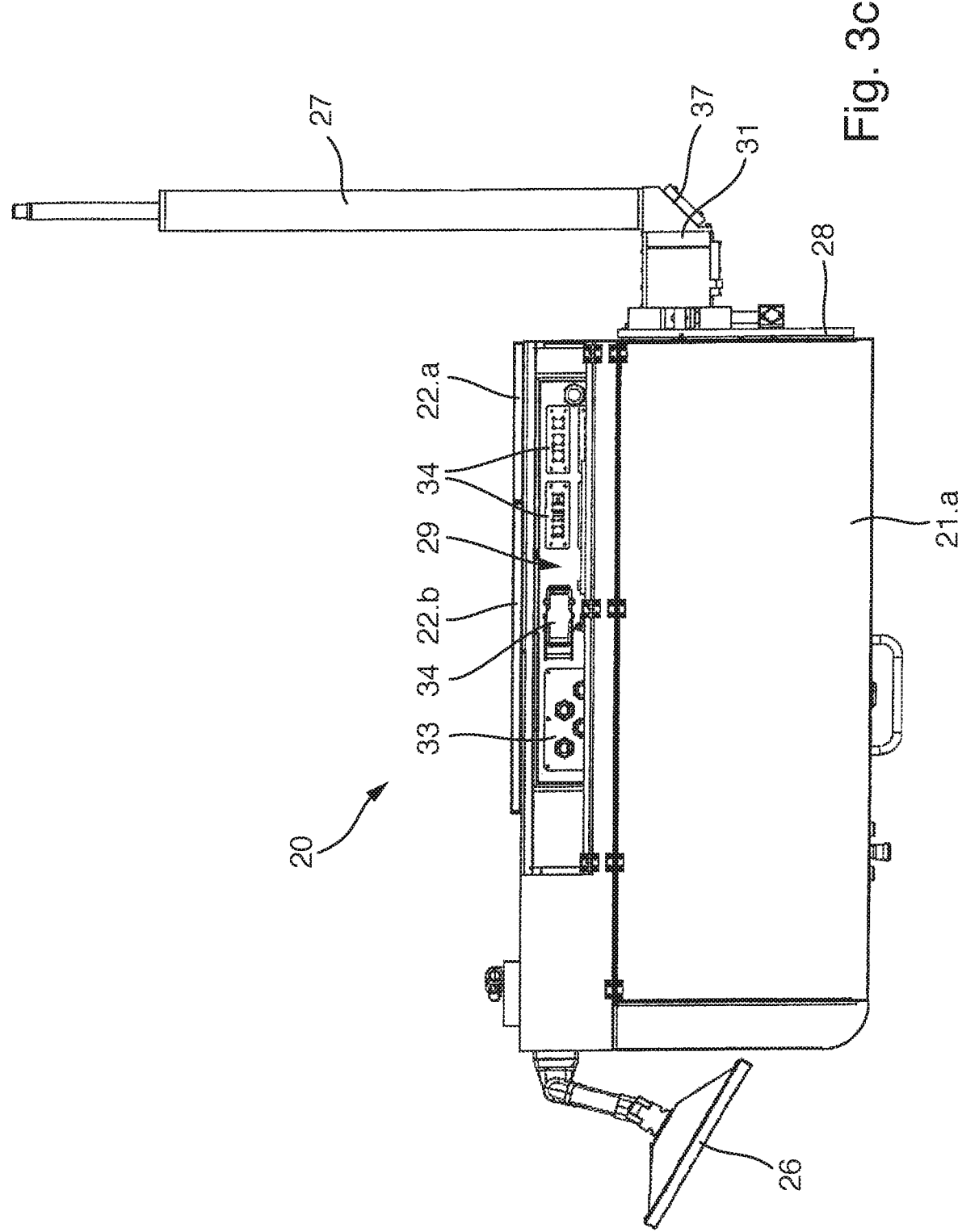

MACHINE FOR THE TOBACCO PROCESSING INDUSTRY, IN PARTICULAR, A FILTER TIPPING MACHINE

CROSS-REFERENCE TO RELATED APPLICATIONS

This application is a Divisional Application of U.S. application Ser. No. 14/305,740 filed on Jun. 16, 2014, the disclosure of which is incorporated by reference it its entirety. The present application claims priority under 35 U.S.C. § 119(a) of German Patent Application No. 10 2013 211 424.9 filed Jun. 18, 2013, the disclosure of which is expressly incorporated by reference herein in its entirety.

BACKGROUND OF THE INVENTION

1. Field of the Invention

Embodiments of the invention relate to a machine of the tobacco processing industry, in particular a filter tipping machine, having a machine frame. The machine frame is designed and configured so that conveying arrangements for rod-like articles of the tobacco processing industry and/or for the components thereof are provided and/or can be arranged on the machine frame.

Embodiments further relate to an arrangement having a machine of the tobacco processing industry, an external laser supply unit and a laser supply unit for at least one laser device for processing rod-like articles of the tobacco processing industry and/or the components thereof.

2. Discussion of Background Information

Cigarette making machines are known from the prior art having the following main assemblies:
- a distributor unit for separating tobacco fibers and for forming and smoothing an endless tobacco rod,
- a rod maker for forming a cigarette rod from the endless tobacco rod by wrapping the endless tobacco rod with a wrap strip such as cigarette paper, which is glued on one edge, and subsequently glued overlapping, after which the endless tobacco rod is cut into tobacco rods (in single or multiple use lengths),
- and a filter tipping unit for producing cigarette filters with which typically an endless filter rod of several use lengths is cut into smaller filter plugs, which are placed between two tobacco rods and are connected thereto via glued connection paper, after which the thusly produced double cigarettes are divided into individual filter cigarettes by central cutting through the affixed filter plugs.

A filter tipping machine is an apparatus, or respectively machine, for producing filter cigarettes with a device for receiving tobacco rods of double use length, with a device for cutting these double length tobacco rods into tobacco rods of single length, with a device for inserting double length filter plugs between the tobacco rods of single use length, with a device for connecting the double length filter rods to the two tobacco rods of single use length by wrapping with a sheet of tipping paper that is separated from a supplied strip of tipping paper via a cutting device, with a device for performing a separating cut through the double length filter plugs so that filter cigarettes arise of single use length. With a single track filter tipping machine, a series of tobacco rod-filter plug-tobacco rod groups, arranged consecutively transverse axially, as a single track material stream to a tipping device.

The document EP 1 213 105 B1 for example discloses a filter tipping machine, the disclosure of which is expressly incorporated by reference herein in its entirety.

Further known from the prior art is that with the assembly of cigarettes on a filter tipping machine, with the filter cigarettes produced using a perforation device, perforations of holes are introduced into the wrapping material or wrap strip of the rod-like article. In particular, the perforations are introduced into the wrap strip using laser beams as coherent radiation.

The document DE 27 54 104 A1, the disclosure of which is expressly incorporated by reference herein in its entirety, for example describes a method for controlling the perforation of cigarettes or other rod-like smoking articles.

Furthermore the document DE 27 51 522 A1 describes a device for producing a zone of desired air permeability in a wrap material strip for rod-like articles of the tobacco processing industry on a machine producing the rod-like articles. The disclosure of this document is expressly incorporated by reference herein in its entirety.

SUMMARY OF THE EMBODIMENTS

Based on this prior art, embodiments of the present invention provide a machine of the tobacco processing industry with a perforation device for rod-like articles and/or for the components thereof. The machine can be easily modified to the spatial conditions in a simple manner.

In accordance with the embodiments, a machine of the tobacco processing industry, in particular a filter tipping machine, can have a machine frame that is designed and configured so conveying arrangements for rod-like articles of the tobacco processing industry and/or the components thereof are provided on the machine frame, and have an external, or respectively separate, laser supply unit for at least one laser device for processing rod-like articles of the tobacco processing industry and/or the components thereof. The laser supply unit has its own separate supply frame that is designed and configured in order to receive one or more supply devices for at least one laser device. The machine frame has an adapter device for a laser device in order to arrange a laser device on or in the machine frame, the supply frame has an adapter device for a laser device in order to arrange a laser device on or in the supply frame, and/or at least one laser device is designed and configured so that the laser device can be arranged or is arranged in co-operation with the adapter device of the machine frame on or in the machine frame, and/or the laser device can be arranged or is arranged in co-operation with the adapter device of the supply frame on or in the supply frame.

Embodiments are based on the idea that a laser device, such as a $CO_2$ laser, for example, can be installed, or respectively adapted without great expenditure on or in corresponding production machines of the tobacco processing industry, such as for example in a filter tipping machine or in a multi-filter making machine, whereby for example a laser device can be inserted in different production machines. Here, for example the laser device with the base housing thereof can be arranged on a laser supply unit, whereby the laser device can be arranged also as a device external to the machine, or respectively a separate device, or as a unit external to the machine for example behind a filter tipping machine. In an alternative, the laser device can also be a part of the production machine so that with the use of the adapter device(s) on or in the machine frame, the housing of the laser device, such as for example the resonator housing of the laser device, is integrated as a component on the machine, such that the devices necessary for operation are provided for the laser device at the external or separate laser supply unit. Hereby, a laser for example which was acquired for an existing filter tipping machine or multi-segment filter making machine, can be used at another, new cigarette making machine, or transferred there, with little expenditure. Thereby, depending on need and application case, additional laser systems can be used successively at several machines of the tobacco processing industry. Thus, costs for expensive laser systems for the perforation of rod-like articles or the components thereof can be advantageously saved. Here, depending on the use case, the laser system can be arranged on the separate laser supply unit or can be arranged for example as a type of attachment directly on the machine frame. Furthermore it is possible to consider respective spatial conditions with the design of the machine and with arrangement of the laser supply unit and the machine.

Hereby a simple, easy to adapt modular design of the machine and the external laser supply unit is attained, so that using the combination and arrangement of the machine frame and the external laser supply unit, the laser device can be adapted to numerous different machines which are designed with an appropriate adapter unit for the laser device.

In a further development is provided that the supply frame is designed and configured in order to receive, preferably in the interior of the supply frame, a control device for the laser device and/or a cooling device for the laser device and/or a voltage supply device for the laser device and/or a compressed air supply device for processing the rod-like articles and/or the components thereof via the laser device.

Advantageously here, in the interior of the supply frame at least one separating wall or several separating walls are provided in order to, preferably completely or respectively substantially completely, separate a device for the laser device selected from the group comprising control device and/or cooling device and/or voltage supply device for the laser device and/or compressed air supply device with respect to another device selected from the same group comprising control device and/or cooling device and/or voltage supply device for the laser device and/or compressed air supply device. Hereby, appropriate spatially separate installation spaces are provided on the supply frame of the external laser supply unit for the control device, the cooling device and for the voltage supply device for operating the laser device and the compressed air supply device for processing, in particular for perforating the rod-like articles and/or the components thereof. In this manner, the different named operating devices for the laser device are arranged separately on or in the supply frame. Hereby the maintenance of the individual operating devices for the laser device is also simplified.

An embodiment of the machine is further directed to the supply frame for the laser device having one, preferably separate, receiving area for at least one laser device or for several, preferably two, laser device. With the use of the adapter device for the laser device, the one laser device can be arranged or is arranged in the receiving area, or using the or several adapter devices of the supply frame, the laser devices can be arranged or are arranged in the receiving area of the supply frame. In the scope of the invention, it can be provided that the laser device has several laser beam sources so that for example with a multi-track filter tipping machine on which several parallel partial flows with rod-like articles are perforated using two or more laser devices, which are received in the receiving area in the supply frame of the external laser supply device. In the scope of the invention it is conceivable that the power of laser devices can be the same or different.

For this purpose, in a further embodiment the machine is provided additionally so that the supply frame of the laser supply unit has a housing that can be closed preferably on all sides using flaps and/or doors on the top side and preferably on at least one or all side walls. This results in a housed supply frame, whereby this results in a compact design, if applicable, of the external laser supply unit due to the operating devices received in the supply frame and if applicable with arrangement of a laser device in the supply frame. Furthermore it is attained that no, or only a few dust particles can enter into the interior of the supply frame, whereby the operating devices for the laser device remain clean. For this purpose the frame is designed with flaps and/or doors, whereby this offers simple and direct handling and accessibility from all sides to the operating devices and/or the laser devices on the supply frame. Furthermore, maintenance work on the operating devices and/or the laser device can be performed easily without completely switching off the production machine.

Moreover, a preferred embodiment of the machine is directed to an arrangement of one or more laser devices in or on the supply frame of the laser supply unit. The laser supply unit is operatively connected, or respectively in operative connection, by at least one laser beam guidance system, with the conveying arrangements of the machine. The laser beam guidance system or the laser beam guidance systems are designed and configured so that laser beams of the one or the laser device(s) are guided or can be guided from the external laser supply unit to a processing site on a machine for processing, in particular perforating, the rod-like articles of the tobacco processing industry and/or the components thereof.

By way of the laser guidance system, it is achieved that the laser beams of the laser device are guided from the external laser supply unit to the appropriate units, for instance conveying works, or respectively conveyor drums, on the machine for producing rod-like products, for instance filter cigarettes, in order to appropriately perforate the rod-like articles and/or the components thereof. Here, appropriate beam splitters and/or deflection mirrors and/or further guiding devices, for instance mirrors, and optics for the laser beams are provided in the laser guidance system in order to appropriately guide the processing of the rod like articles and/or the components thereof towards the processing site on the production machine.

Furthermore, it is preferred with the machine that the laser device has a resonator housing, and the resonator housing is designed and configured for arranging in or on the machine frame and/or for arranging in or on the supply frame, wherein in particular, the laser is designed as a $CO_2$ laser.

In addition, a preferred embodiment of the machine is directed to an arrangement of one or more laser devices in or on the machine frame of the machine. The preferably laser device-free, separate, or respectively external, laser supply unit is connected by a supply connection system to the laser device(s) on the machine. The supply connection system is designed and configured so that the control device and/or the cooling device and/or the voltage supply device are connected to the laser device(s), so that the laser device adapted to the machine or laser devices adapted to the machine are operated or can be operated for processing, in particular for perforating the rod-like articles and/or the components thereof.

Furthermore, it is preferred in an embodiment of the machine that the laser supply unit has at least one or more connectors, in particular plugs or plug receptacles, for further devices and/or that the laser supply unit has at least one, preferably touch-sensitive, display unit and/or one preferably touch-sensitive input unit. Here, the plug connections can be designed as a plug connection for a bus system as well as for fiber optics and further data connections.

Embodiments are directed to an arrangement, or respectively by a device with a machine of the tobacco processing industry and an external laser supply unit which is further characterized in that with the arrangement of one or more laser devices in or on the machine frame of the machine, the external laser supply unit is connected by a supply connection system to the laser device(s) on the machine. The supply connection system is designed and configured so that the control device and/or the cooling device and/or the voltage supply device are connected to the laser device(s), so that the one laser device or the laser devices are operated or can be operated for processing, in particular for perforating, the rod-like articles and/or the components thereof.

For this purpose it is advantageously further provided with the arrangement that the laser supply unit has several plugs and/or plug receptacles for further devices and that the laser supply unit has at least one, preferably touch-sensitive display unit and/or one preferably touch-sensitive input unit.

The arrangement in advantageous embodiments can have further features which are named and explained in conjunction with the machine of the tobacco processing industry described above. We expressly refer to the above explanations in order to avoid repetitions.

Embodiments are directed to a laser supply unit for at least one laser device for processing rod-like articles of the tobacco processing industry and/or the components thereof. The laser supply unit has a supply frame that is designed and configured, in order to receive one or more supply devices for at least one laser device. The supply frame has an adapter device for a laser device in order to arrange a laser device on or in the supply frame, and/or at least one laser device is designed and configured so that the laser device is or can be brought in operative connection with the adapter device of a machine of the tobacco processing industry, and/or the laser device is arranged in co-operation with the adapter device of the supply frame on or in the supply frame.

The laser supply unit is further characterized in that the supply frame is designed and configured in order to receive a control device for the laser device and a cooling device for the laser device and a control supply device for the laser device and a compressed air supply device.

In addition, in a further embodiment of the laser supply unit it is provided that in the interior of the supply frame at least one separating wall or several separating walls are provided in order to preferably substantially completely separate a device for the laser device selected from the group comprising control device and/or cooling device and/or voltage supply device for the laser device and/or compressed air supply device with respect to another device selected from the same group comprising control device and/or cooling device and/or voltage supply device for the laser device and/or air supply device.

The supply frame for the laser device preferably has one separate receiving area for at least one laser device or for several, preferably two, laser devices, wherein with the use of the adapter device for the laser device, the one laser device can be arranged or is arranged in the receiving area, or wherein using the or several adapter devices of the supply frame the laser devices can be arranged or are arranged in the receiving area of the supply frame.

Additionally with the laser supply unit according to a further embodiment it is provided that the supply frame of the laser supply unit has a housing, preferably closable on the top side and laterally, with flaps and or doors, and that the laser supply unit has at least one, preferably touch-sensitive, display unit and/or one, preferably touch-sensitive, input unit.

In particular with the arrangement of one or more laser devices in or on the supply frame of laser supply unit, the laser supply unit can be connected via a laser beam guidance system to a machine of the tobacco processing industry, wherein the laser guidance system is designed and configured so that laser beams of the one or the laser device(s) can be guided from the laser supply unit to a processing site on a machine for processing, in particular perforating, the rod-like articles of the tobacco processing industry and/or the components thereof.

With an embodiment of the laser supply unit it is preferable that with a separate arrangement of one or more laser devices, the laser supply unit can be connected by a supply connection system to the separate laser device(s). The supply connection system is designed and configured so that the control device and the cooling device and the voltage supply device are connected to the separate laser device(s) so that the one separate laser device or the separate laser devices can be driven to operate, in particular perforate, the rod-like articles and/or the components thereof.

Moreover, the laser supply unit preferably has several plugs and/or plug receptacles for at least two, particularly different, machines of the tobacco processing industry and/or for a connection to, in particular, a local network and/or a factory network and/or an Internet connection and/or a central compressed air supply and/or a central cooling supply.

Using a laser supply unit according to the invention simplifies and improves the handling of one or more laser devices at different machines of the tobacco processing industry, in particular, filter tipping machines.

In the scope of the invention the laser supply unit in advantageous embodiments can have further features which were cited and explained in conjunction with the machine of the tobacco processing industry described above. The above explanations are referred to here in order to avoid repetitions.

Further features of the invention will become apparent from the description of the embodiments according to the invention together with the claims and the included drawings. Embodiments according to the invention can fulfill individual characteristics or a combination of several characteristics.

Embodiments of the invention are directed to a machine of the tobacco processing industry. The machine includes a machine frame structured to support at least one of conveying arrangements for rod-like articles of the tobacco processing industry and components for conveying rod-like articles of the tobacco processing industry; at least one laser device structured and arranged for processing at least one of rod-like articles of the tobacco processing industry and components of the rod-like articles of the tobacco processing industry; and a laser supply unit for the at least one laser device that includes a supply frame structured to receive one or more supply devices for at least one laser device. The machine also includes at least one of: the machine frame has an adapter device structured so that at least one laser device is positionable one of on or in the machine frame, the supply frame has an adapter device structured so that at least one laser device is positionable one of on or in the supply frame, the at least one laser device is structured to be positionable in co-operation with the adapter device of the machine frame one of on or in the machine frame, and the at least one laser device is positionable in co-operation with the adapter device of the supply frame one of on or in the supply frame.

In embodiments, the machine may be structured as a filter tipping machine.

According to embodiment, the supply frame can be structured and arranged to receive at least one of a control device for the laser device, a cooling device for the laser device, a voltage supply device for the laser device and a compressed air supply device for processing the at least one of the rod-like articles and the components of the rod-like articles via the at least one laser device. An interior of the supply frame can include: at least one separating wall structured and arranged to substantially completely separate a device for the laser device that includes at least one of a control device, cooling device, a voltage supply device for the laser device, and a compressed air supply device from another device for the laser device that includes another control device, another cooling device, another voltage supply device for the laser device and another compressed air supply device.

In accordance with other embodiments, the supply frame for the laser device has a receiving area for at least one laser device, and one of: via the adapter device for the laser device, the at least one laser device is arrangeable in the receiving area, or via the adapter devices of the supply frame, the at least one laser device is arrangeable in the receiving area of the supply frame. The receiving area may include at least two separate receiving areas and the at least one laser device may include at least two laser device.

According to still other embodiments of the invention, the supply frame of the laser supply unit has a housing with at least one of flaps and doors. Further, the housing is closable on all sides.

In embodiments, the machine can further include a beam guidance system. With the arrangement of the at least one laser device one of in or on the supply frame of the laser supply unit, the laser supply unit is operatively connected via the at least one laser beam guidance system to the conveying arrangements of the machine. The at least one laser beam guidance system can be structured and arranged so that laser beams of the at least one laser device are guidable from the laser supply unit to a processing site on the machine for processing at least one of the rod-like articles of the tobacco processing industry and the components of the rod-like articles of the tobacco processing industry. The processing may include perforating at least one of the rod-like articles of the tobacco processing industry and the components of the rod-like articles of the tobacco processing industry.

In still other embodiments, the at least one laser device can include a $CO_2$ laser having a resonator housing structured to be at least one of positionable one of in or on the machine frame and positionable one of in or on the supply frame.

Embodiments of the instant invention are directed to an arrangement that includes a machine of the tobacco processing industry having a machine frame; an external laser supply unit; one or more laser devices positionable one of in or on the machine frame of the machine; a supply connection system being structured to connect the external laser supply unit to the one or more laser devices; and the supply connection system being structured to connect at least one of a control device, a cooling device and a voltage supply device to the one or more laser devices so that the one or more laser devices is operable for processing at least one of rod-like articles and components of the rod-like articles.

According to embodiments, the external laser supply unit can have at least one of a plurality of plugs and a plurality of plug receptacles for further devices, and that the laser supply unit may have at least one of a display unit and an input unit. The display unit can include a touch-sensitive display unit and the input unit can include a touch-sensitive input unit.

Embodiments are directed to a laser supply unit for at least one laser device for processing at least one of rod-like articles of the tobacco processing industry and components of rod-like articles of the tobacco processing industry. The laser supply unit includes a supply frame structured to receive one or more supply devices for the at least one laser device; and at least one of: an adapter device structured to position the at least one laser device one of on or in the supply frame, at least one laser device structured to be positionable in operative connection with an adapter device of a machine of the tobacco processing industry, the at least one laser device being positionable in co-operation with the adapter device of the supply frame one of on or in the supply frame.

In accordance with embodiments of the invention, the supply frame may be structured and arranged to receive a control device for the laser device, a cooling device for the laser device, a control supply device for the laser device and a compressed air supply device. An interior of the supply frame may include at least one separating wall structured and arranged to separate a device for the laser device selected from the group consisting of: a control device, a cooling device, a voltage supply device for the laser device and a compressed air supply device from another device selected from the same group consisting of: another control device, another cooling device, another voltage supply device for the laser device and another compressed air supply device.

According to other embodiments, the supply frame for the at least one laser device may have separate receiving areas for the at least one laser device, and at least one of: via the adapter device for the at least one laser device, the at least one laser device is positionable in the receiving area, or via the adapter device of the supply frame, the laser devices may be positionable in the receiving area of the supply frame.

In embodiments, the supply frame of the laser supply unit can have a housing closable on a top and at sides with at least one of flaps and doors, and that the laser supply unit may have at least one of a display unit and an input unit. The display unit may include a touch sensitive display unit and the input unit comprises a touch sensitive input unit.

According to still other embodiments, with the at least one laser device positioned one of in or on the supply frame of the laser supply unit, the at least one laser supply unit can be connectable, via a laser beam guidance system, to a machine of the tobacco processing industry, and wherein the laser guidance system may be structured and arranged to guide the laser beams of the at least one laser device from the laser supply unit to a processing site on a machine for processing, in particular perforating, the at least one of rod-like articles of the tobacco processing industry and the components of rod-like articles of the tobacco processing industry.

In accordance with still further embodiments of the invention, the at least one laser device can include at least two laser devices, and, with separate arrangements for the at least two laser devices, the laser supply unit may be connectable, via a supply connection system, to the at least two separate laser devices, and the supply connection system is structured and arranged to connect a control device and a cooling device and a voltage supply device to the at least two separate laser devices so that the at least two separate laser devices are operable for processing, in particular for perforating, the at least one of rod-like articles of the tobacco processing industry and the components of rod-like articles of the tobacco processing industry.

In accordance with still yet other embodiments of the present invention, the laser supply unit may also include at least one of a plurality of plugs and a plurality of plug receptacles for at least one of: at least two machines of the tobacco processing industry; and a connection to at least one of a local network, a factory network, an internet connection, a central compressed air supply and a central cooling unit supply.

Other exemplary embodiments and advantages of the present invention may be ascertained by reviewing the present disclosure and the accompanying drawing.

BRIEF DESCRIPTION OF THE DRAWINGS

The invention is described below, without restricting the general idea of the invention, based on exemplary embodiments in reference to the drawings, whereby we expressly refer to the drawings with regard to the disclosure of all details according to the invention that are not explained in greater detail in the text. The figures show:

FIG. 2 illustrates a further example embodiment of an arrangement of a machine for producing rod-like articles having a laser supply unit according to a second embodiment; and FIGS. 3a, 3b, 3c schematically illustrate different views of a laser supply unit.

DETAILED DESCRIPTION OF THE EMBODIMENTS

Figure 1:
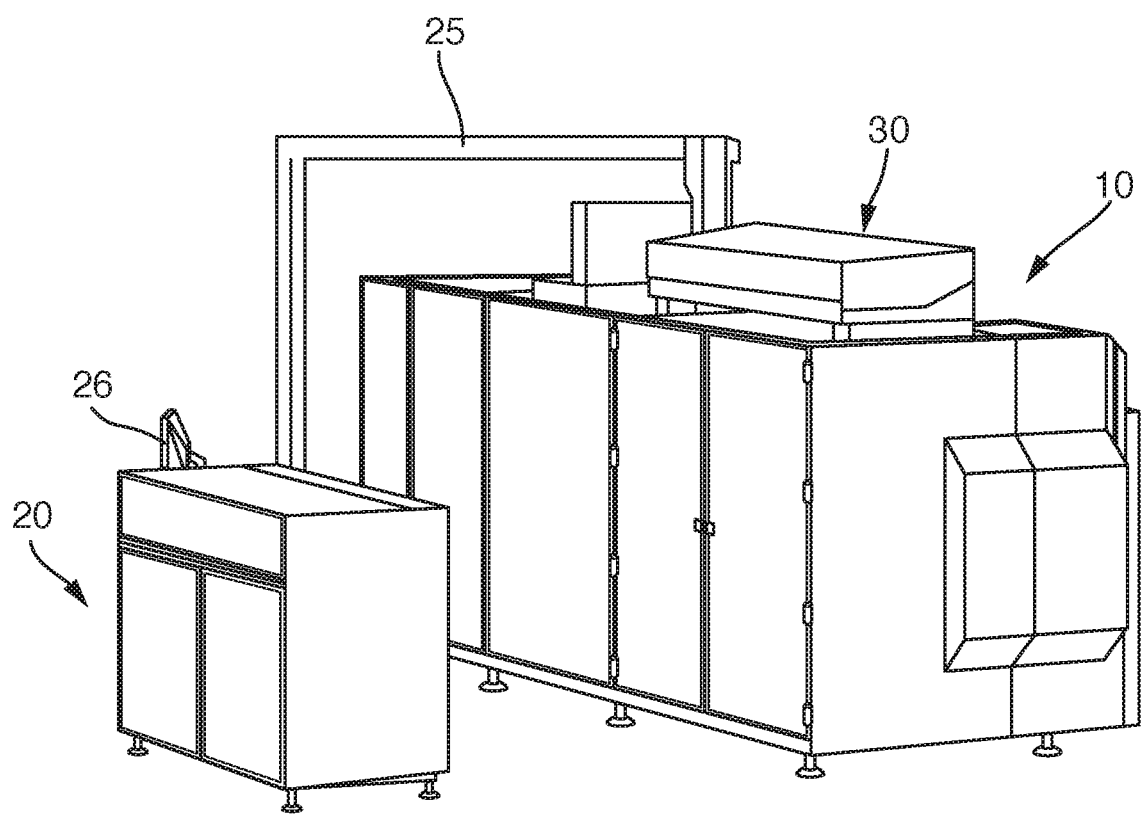
FIG. 1 illustrates an example embodiment of an arrangement of a machine for producing rod-like articles having a separate laser supply unit according to a first example embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the drawings, the same or similar types of elements and/or parts are provided with the same reference numbers so that a corresponding re-introduction can be omitted.

FIG. 1 schematically shows a perspective view of an example embodiment of an arrangement of a schematically represented filter tipping machine 10 and a separately established laser supply unit 20. The filter tipping machine 10 is represented in section, wherein for reasons of clarity of the drawing, further unit(s) or respectively devices, are omitted. The backside of the filter tipping machine 10 can be seen in FIG. 1. Further, the filter tipping machine 10 has a (not visible) machine frame in which conveyor drums and further devices necessary for the operation are arranged.

The laser supply unit 20, established separately here, is arranged behind the backside of the filter tipping machine 10 and has its own supply frame (not represented here). The laser supply unit 20 is designed having a closed housing.

A laser device 30 is arranged on the top side of the filter tipping machine 10 using an adapter unit (not shown in detail), so that the laser device 30, for example a $CO_2$ laser, can be releasably arranged for generating laser beams on the machine so that with use of the laser beams perforations are created in the filter cigarettes or the components thereof produced with the filter tipping machine 10. The laser device 30 is arranged above the machine frame of the filter tipping machine 10 and connected thereto with the interposition of the adapter device.

For operating the laser device 30, the externally, or respectively separately, arranged laser supply unit 20 is connected via a connection channel 25 to the laser device 30 in order to appropriately control and operate the laser, or respectively the laser device 30. The supply units or supply modules necessary for the operation of the laser device 30 are arranged, or respectively housed, here in the laser supply unit 20.

FIG. 2 shows a perspective view in section of a further example embodiment of an arrangement of a filter tipping machine 10 and a separately arranged laser supply unit 20. The laser supply unit 20 is arranged here behind the backside of the filter tipping machine 10, wherein a laser device 30 is arranged in the laser supply unit 20. The laser device is not visible due to the protection, or respectively the closed housing of the laser supply unit 20.

A compact design is attained due to the arrangement of the operating devices for the laser device and the arrangement of the laser device in the laser supply unit 20. For connecting and for guiding the laser beams generated in the laser supply unit 20 via the laser device 30, a beam guidance device 27 is provided in the form of a duct or the like, in order to guide the laser beams from the laser supply unit 20 to the processing sites on the filter tipping machine 10 for processing, or respectively for perforating, rod-like articles and/or the components there of (not shown here).

As a result of the fact that the laser device is releasably arranged within the laser supply unit 20 and with the use of an appropriate adapter device in the laser supply unit 20, with a combination of the laser supply unit 20 with another filter tipping machine, the laser device can be removed from the laser supply unit 20 and subsequently be arranged on an appropriate further filter tipping machine 10 provided with an adapter device. Then, the operating devices for the laser device are connected to the laser device then arranged on the filter tipping machine in order to appropriately operate the laser device, as is schematically represented in the example embodiment according to FIG. 1.

Figure 3A:
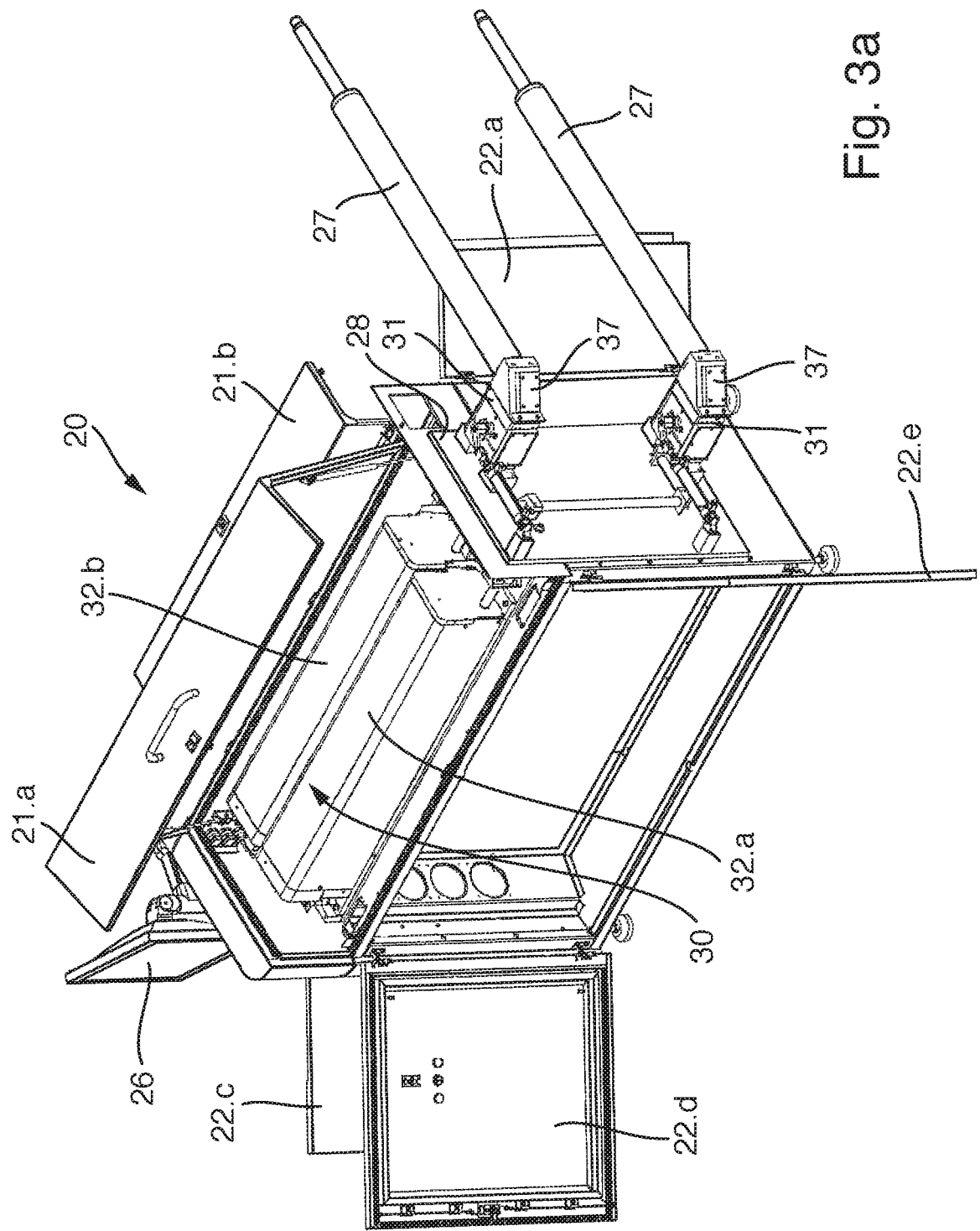

The FIGS. 3a, 3b and 3c show different views of a laser supply unit 20, wherein the laser supply unit 20 is shown in an open state in FIGS. 3a and 3b.

The laser supply unit 20 has flaps 21.a, 21.b on the top side and doors 22.a, 22.b, 22.c, 22.e and 22.e on the long and short sides. FIGS. 3a, 3b show perspective representations of the laser supply unit 20 with opened flaps 21.a, 21.b and open doors 22.a to 22.e. FIG. 3a schematically shows a perspective view of the front side, and FIG. 3b schematically shows a perspective back view of the laser supply unit 20. FIG. 3c shows a schematic top view of the laser supply unit 20.

As seen in FIG. 3a, two resonator devices 32.a and 32.b for generating two laser beams are arranged parallel next to each other in the interior of the open laser supply unit 20. Here, the resonator devices 32.a, 32.b are separated in the interior by separation walls with respect to the other installation spaces of the laser supply unit 20. In addition, a voltage supply unit 23, for example in the form of a transformer and a DC module, for supplying the resonator devices 32.a, 32.b are arranged in a separate installation space in the interior of the laser supply unit 20.

Moreover, a cooling device 24 for the laser device 30 is arranged in the interior of the laser supply unit 20 in a further separate installation space. In addition to that, an appropriate pneumatic device is also provided for the filter tipping machine in the interior of the laser supply unit 20. Due to the fact that space is provided beneath the flap 21.a for two resonator devices 32.a, 32.b arranged next to each other, the laser supply unit 20 can be optionally formed with one or both resonator devices 32.a, 32.b for generating laser beams.

As seen in the representation in FIG. 3b, additionally a compressed air supply device 35 is provided in the inside of the installation space behind the door 22.c.

A beam output plate 28 is arranged on the face side of the laser supply unit 20 so that the laser beams generated in the resonator devices 32.a, 32.b are guided with use of appropriate optics and further optical devices, for instance a beam multiplier or and integrated mirror equivalent and/or mirror, etc., from the laser supply unit 20 to the processing sites on a filter tipping machine.

Two laser guide devices 27 are arranged at the beam output plate 28 in order to guide the laser beams generated by the resonator devices 32.a, 32.b from the laser supply unit 20 to the processing sites on the filter tipping machine 10. The two laser guide devices 27 are arranged in parallel to each other, wherein each laser guide device 27 is connected via an optical device 31 and a mirror 37 to the beam output plate 28 in order to appropriately deflect and guide the laser beams from the laser supply unit.

In addition, as seen in the top view in FIG. 3c, the laser supply unit 20 in the interior has a plug arrangement 29 and a cable feed-through 33 so that the laser supply unit 20 is connected to further devices or to further control devices or the like. The plug arrangement 29 can comprise connection devices and/or plug devices for data lines such as multiple plugs, fiber optics, coaxial cables and network cables. Here, plug connections 34 are provided for example in the form of plugs as well as plug receptacles, or respectively plug sockets. In addition, a multiple plug connection can also be provided.

For improved operability and control of the laser supply unit 20, preferably a touch-sensitive, display 26 is provided on the side of the housing of the laser supply unit 20.

All named characteristics, including those taken from the drawings alone, and individual characteristics, which are disclosed in combination with other characteristics, are considered individually and in combination as essential to the invention. Embodiments according to the invention can be fulfilled through individual characteristics or a combination of several characteristics. In the scope of the invention, characteristics, which are designated with "in particular" or "preferably" are facultative features.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE LIST 10 filter tipping machine
20 laser supply unit
21.a, 21.b flap
22.a-22.e door
23 voltage supply unit
24 cooling device
25 connection channel
26 display
27 beam guidance device
28 beam output plate
29 plug arrangement
30 laser device
32.a, 32.b resonator device
31 optical device
33 cable feed-through
34 plug connection
35 compressed air supply device
37 mirror

What is claimed:

1. A machine of the tobacco processing industry for processing at least one of rod-like articles of the tobacco processing industry or components of rod-like articles of the tobacco processing industry comprising:
 a machine frame structured to support conveying arrangements for the at least one of rod-like articles of the tobacco processing industry or components of rod-like articles of the tobacco processing industry;
 at least one laser device structured and arranged for processing the at least one of rod-like articles of the tobacco processing industry or components of rod-like articles of the tobacco processing industry;
 a laser supply unit for the at least one laser device, said laser supply unit comprising:
  a supply frame structured to receive one or more supply devices for the at least one laser device; and
  a supply frame adapter device structured to position the least one laser device one of on or in the supply frame; and
 a laser beam guidance device,
 wherein, with an arrangement of the at least one laser device one of on or in the supply frame of the laser supply unit, the laser supply unit is operatively connected via the laser beam guidance device to the conveying arrangements of the machine, and
 wherein the laser beam guidance device is structured and arranged so that laser beams of the at least one laser device are guidable from the laser supply unit to a processing site on the machine for processing at least one of the rod-like articles of the tobacco processing industry and components of the rod-like articles of the tobacco processing industry.

2. The machine of the tobacco processing industry according to claim 1, wherein the supply frame is structured and arranged to receive a control device for the at least one laser device, a cooling device for the at least one laser device, a voltage supply device for the at least one laser device and a compressed air supply device.

3. The machine of the tobacco processing industry according to claim 2, wherein an interior of the supply frame comprises at least one separating wall structured and arranged to separate a first device for the at least one laser device selected from the group consisting of: the control device, the cooling device, the voltage supply device and the compressed air supply device from another device selected from the same group consisting of: another control device, another cooling device, another voltage supply device and another compressed air supply device.

4. The machine of the tobacco processing industry according to claim 1, wherein the supply frame has a receiving area for the at least one laser device, and
wherein, via the supply frame adapter device, the at least one laser device is positionable in the receiving area of the supply frame.

5. The machine of the tobacco processing industry according to claim 1, wherein the supply frame of the laser supply unit has a housing closable on a top and at sides with at least one of flaps or doors, and that the laser supply unit has at least one of a display unit or an input unit.

6. The machine of the tobacco processing industry according to claim 5, wherein the display unit comprises a touch screen display unit and the input unit comprises a touch screen input unit.

7. The machine of the tobacco processing industry according to claim 1, further comprising plug arrangements, including at least one of a plurality of plugs and a plurality of plug receptacles, for at least one of: connecting to another machine of the tobacco processing industry or connecting to at least one of a local network, a factory network, an internet connection, a central compressed air supply or a central cooling unit supply.

8. The machine of the tobacco processing industry according to claim 1, wherein the machine of the tobacco processing industry for processing the at least one of rod-like articles of the tobacco processing industry or components of rod-like articles of the tobacco processing industry is a machine for perforating the at least one of rod-like articles of the tobacco processing industry or components of rod-like articles of the tobacco processing industry.

9. The machine of the tobacco processing industry according to claim 1, wherein the laser supply unit is located externally from the machine frame, and
wherein the laser beam guidance device extends between the laser supply unit and the machine frame.

* * * * *